United States Patent
Kobayashi et al.

(10) Patent No.: US 8,340,860 B2
(45) Date of Patent: Dec. 25, 2012

(54) ACCELERATION DETECTION DEVICE, ACCELERATION DETECTION METHOD, AND NEUTRAL CONTROL DEVICE EMPLOYING SAME

(75) Inventors: Atsufumi Kobayashi, Yamato (JP);
Tomoyuki Suzuki, Sagamihara (JP);
Takashi Matsuda, Isehara (JP)

(73) Assignee: Nissan Motor Co., Ltd., Yokohama (JP)

( * ) Notice: Subject to any disclaimer, the term of this patent is extended or adjusted under 35 U.S.C. 154(b) by 1006 days.

(21) Appl. No.: 11/950,664

(22) Filed: Dec. 5, 2007

(65) Prior Publication Data
US 2008/0140291 A1 Jun. 12, 2008

(30) Foreign Application Priority Data
Dec. 7, 2006 (JP) ................................. 2006-330139

(51) Int. Cl.
*G01M 17/00* (2006.01)

(52) U.S. Cl. ......... 701/30.8; 701/30.5; 73/1.38; 702/87; 702/104

(58) Field of Classification Search .................... 701/70, 701/116, 124, 74, 79, 472, 475, 469, 500, 701/504, 507, 527; 73/1.37, 1.38, 1.75, 1.77, 73/1.79, 514.01; 702/85, 86, 87, 141
See application file for complete search history.

(56) References Cited

U.S. PATENT DOCUMENTS

| | | | | |
|---|---|---|---|---|
| 5,265,472 A | * | 11/1993 | Pfeifle et al. ................ | 73/514.02 |
| 5,307,274 A | * | 4/1994 | Takata et al. .................... | 701/70 |
| 5,483,452 A | * | 1/1996 | Tanaka ............................ | 701/70 |
| 5,526,263 A | * | 6/1996 | Tanaka et al. ................... | 701/70 |
| 5,579,230 A | * | 11/1996 | Lin et al. ......................... | 701/70 |
| 6,347,541 B1 | * | 2/2002 | Maleki ........................... | 73/1.38 |
| 6,411,881 B1 | * | 6/2002 | Thomas ......................... | 701/67 |
| 6,658,935 B1 | * | 12/2003 | Feinberg ..................... | 73/382 G |
| 6,820,002 B2 | * | 11/2004 | Terada ........................... | 701/505 |
| 6,928,382 B2 | * | 8/2005 | Hong et al. ................... | 702/141 |
| 6,959,240 B2 | * | 10/2005 | Okamoto ........................ | 701/70 |
| 6,964,188 B2 | * | 11/2005 | Streit et al. .................... | 73/1.38 |

(Continued)

FOREIGN PATENT DOCUMENTS

DE 10314998 A1 6/2004

(Continued)

OTHER PUBLICATIONS

The extended European Search Report of corresponding European Patent Application No. 07122216.0, dated Jun. 24, 2011.

*Primary Examiner* — Thomas Black
*Assistant Examiner* — Sze-Hon Kong
(74) *Attorney, Agent, or Firm* — Global IP Counselors, LLP

(57) ABSTRACT

An acceleration detection device for detecting detected acceleration of a vehicle is provided with a stopped acceleration detector, an acceleration change detector, an acceleration estimating unit and a correcting unit. The stopped acceleration detector detects a detected stationary acceleration value when the vehicle is stopped on a sloping road based on an acceleration sensor signal from an acceleration sensor mounted on the vehicle. The acceleration change detector detects an acceleration change associated with the vehicle transitioning from a stationary state to a driving state on the sloping road based on the acceleration sensor signal. The acceleration estimating unit estimates an estimated stationary acceleration value based on the acceleration change that was detected by the acceleration change detector. The correcting unit corrects the detected stationary acceleration value based on a deviation between the estimated stationary acceleration value and the detected stationary acceleration value.

16 Claims, 5 Drawing Sheets

U.S. PATENT DOCUMENTS

| | | | |
|---|---|---|---|
| 7,444,867 B2* | 11/2008 | Brett et al. | 73/382 R |
| 7,505,865 B2* | 3/2009 | Ohkubo et al. | 702/142 |
| 7,580,784 B2* | 8/2009 | Schmidt et al. | 701/70 |
| 7,620,504 B2* | 11/2009 | Ogawa | 702/41 |
| 7,680,578 B2* | 3/2010 | Matsunaga et al. | 701/80 |
| 7,747,383 B2* | 6/2010 | Ohkubo et al. | 701/504 |
| 7,765,085 B2* | 7/2010 | Osaki et al. | 702/154 |
| 8,160,797 B2* | 4/2012 | Amamiya et al. | 701/93 |
| 2001/0044359 A1* | 11/2001 | Saito et al. | 477/92 |
| 2001/0046925 A1* | 11/2001 | Saito et al. | 477/92 |
| 2003/0184155 A1* | 10/2003 | Crombez et al. | 303/152 |
| 2004/0064234 A1* | 4/2004 | Okamoto | 701/70 |
| 2004/0099044 A1* | 5/2004 | Streit et al. | 73/1.38 |
| 2005/0178628 A1* | 8/2005 | Uchino et al. | 188/379 |
| 2005/0234626 A1* | 10/2005 | Shiiba et al. | 701/70 |
| 2006/0079377 A1* | 4/2006 | Steen et al. | 477/186 |
| 2006/0080033 A1* | 4/2006 | Komatsu | 701/209 |
| 2006/0236761 A1* | 10/2006 | Inoue et al. | 73/510 |
| 2006/0293826 A1* | 12/2006 | Hong et al. | 701/96 |
| 2007/0083314 A1* | 4/2007 | Corigliano et al. | 701/80 |
| 2008/0015755 A1* | 1/2008 | Kuwahara et al. | 701/48 |
| 2008/0059021 A1* | 3/2008 | Lu et al. | 701/36 |

FOREIGN PATENT DOCUMENTS

| | | |
|---|---|---|
| EP | 0751325 | 1/1997 |
| JP | H07-159438 | 6/1995 |

* cited by examiner

ACCELERATION DETECTION DEVICE, ACCELERATION DETECTION METHOD, AND NEUTRAL CONTROL DEVICE EMPLOYING SAME

CROSS-REFERENCE TO RELATED APPLICATIONS

This application claims priority to Japanese Patent Application No. 2006-330139, filed on Dec. 7, 2006. The entire disclosure of Japanese Patent Application No. 2006-330139 is hereby incorporated herein by reference.

BACKGROUND OF THE INVENTION

1. Field of the Invention

The present invention generally relates to technological field of devices detecting acceleration devices and detecting acceleration methods, as well as neutral control devices employing these acceleration devices or methods. More specifically, the present invention relates to correcting an error in a detected acceleration of a vehicle.

2. Background Information

In conventional acceleration detection devices, a zero point correction of an acceleration sensor is carried out by averaging detected acceleration values each time that the vehicle stops, and adding or subtracting this average value (drift from the zero point of the acceleration sensor) to or from the current detected acceleration value (see for example, Japanese Laid-Open Patent Application No. 7-159438). Thus, the zero point correction aids in eliminating the effect of a sloping road on the acceleration sensor.

In view of the above, it will be apparent to those skilled in the art from this disclosure that there exists a need for correcting the drift error or the like of a vehicle acceleration sensor. This invention addresses this need in the art as well as other needs, which will become apparent to those skilled in the art from this disclosure.

SUMMARY OF THE INVENTION

However, it has been discovered that since the conventional technology mentioned above employs detected acceleration values taken when the vehicle is stopped, a problem may arises in that it will not be possible to detect correctly drift in instances where there are frequent stops on sloping roads, such as where the parking space of the home is on an incline, for example. Thus, the precision of zero point correction may be poor.

Therefore, in view of the foregoing problem, one object of the present invention to improve the accuracy for detecting acceleration.

In order to achieve the above object of the present invention, an acceleration detection device for detecting detected acceleration of a vehicle is provided that basically comprises a stopped acceleration detector, an acceleration change detector, an acceleration estimating unit and a correcting unit. The stopped acceleration detector detects a detected stationary acceleration value when the vehicle is stopped on a sloping road based on an acceleration sensor signal from an acceleration sensor mounted on the vehicle. The acceleration change detector detects an acceleration change associated with the vehicle transitioning from a stationary state to a driving state on the sloping road based on the acceleration sensor signal. The acceleration estimating unit estimates an estimated stationary acceleration value based on the acceleration change that was detected by the acceleration change detector. The correcting unit corrects the detected stationary acceleration value based on a deviation between the estimated stationary acceleration value and the detected stationary acceleration value.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
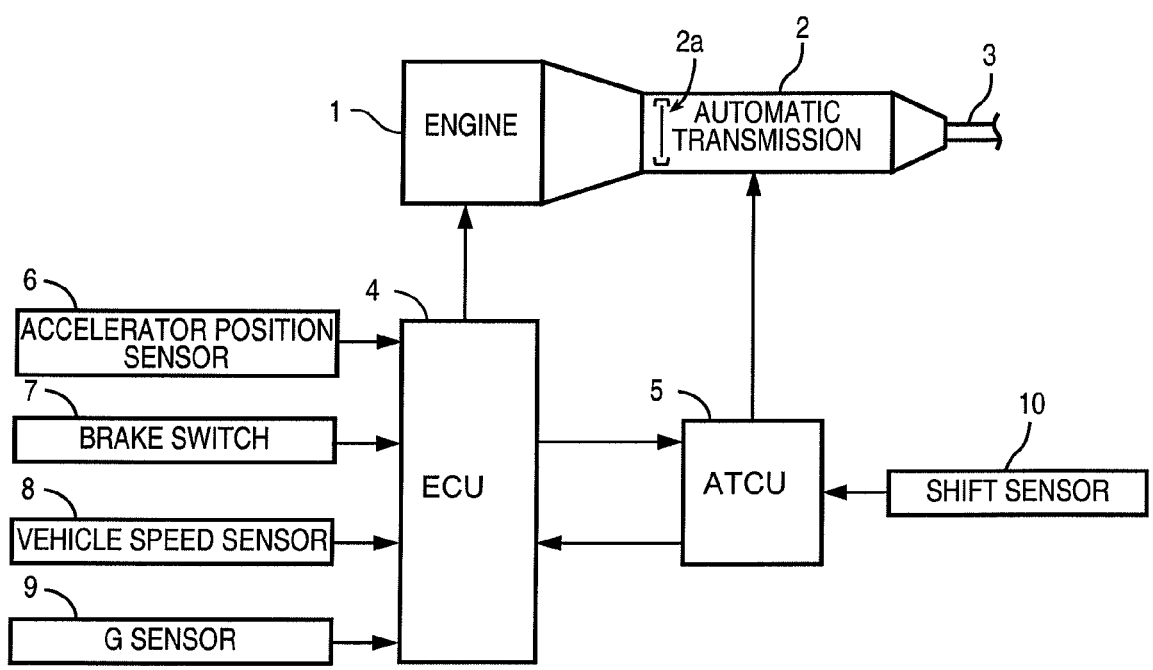
FIG. 1 is a schematic system diagram of a vehicle drive train with a neutral control device equipped with an acceleration detection device in accordance with one embodiment.

Referring initially to FIG. 1, a system configuration diagram is illustrated depicting a vehicle drive train with a neutral control device embodying the acceleration detection device in accordance with a first embodiment of the present invention. The vehicle drive train basically includes an on-board engine 1, an automatic transmission 2 coupled to the engine 1 and an output shaft 3 coupled to the automatic transmission 2. The rotational output of the engine 1 undergoes a prescribed modification by the automatic transmission 2, and is then output from the output shaft 3. The vehicle is equipped with an engine controller (ECU) 4 and an automatic transmission controller (ATCU) 5 for the purpose of controlling the engine 1, the automatic transmission 2, and the like on the basis of various detection values from various types of sensors, to be discussed later. The two controllers 4 and 5 are connected so as to be capable of intercommunication, and constitute a neutral control device.

The vehicle is provided with various on-board sensors such as an accelerator position sensor 6, a brake switch 7, a vehicle speed sensor 8, an acceleration sensor (G sensor) 9, a shift sensor 10, and the like.

The accelerator position sensor 6 outputs an accelerator position signal to the engine controller 4. The brake switch 7 outputs a brake switch signal to the engine controller 4 for indicating whether the brake (not shown) pedal has been depressed to apply a braking force to the wheels. The vehicle speed sensor 8 detects the driving speed of the vehicle (vehicle speed) on the basis of the rotational speed of the wheels as determined from wheel speed sensors provided to the wheels, and outputs a vehicle speed signal to the engine controller 4. The G sensor 9 detects acceleration acting on the vehicle, and outputs an acceleration signal to the engine controller 4. The shift sensor 10 detects the shift position of the automatic transmission 2, and outputs a shift position signal to the automatic transmission controller 5.

The vehicle is considered to be in the neutral state for neutral control by the neutral control device (e.g., the engine controller 4 and the automatic transmission controller 5) shown in FIG. 1, when the shift position of the automatic transmission 2 is in a forward drive position, the accelerator pedal is not depressed, the vehicle is at a stop through depression of the brake pedal, and the gradient of the roadway does not exceed a prescribed angle. During neutral control by the neutral control device, the clutch (engaging element) 2a of the automatic transmission 2 that engages when the vehicle starts to move will be released, so that neutral control can be performed with the vehicle in the neutral state. The accelerator position sensor 6, the brake switch 7, the vehicle speed sensor 8 and the shift sensor 10 cooperate together to constitute a vehicle stopped status determination unit configured to determine whether the vehicle is currently stopped. The accelerator position sensor 6, the brake switch 7, the vehicle speed sensor 8 and the shift sensor 10 also cooperate together to constitute a driving status determination unit that determines whether the vehicle is currently being driven. Alternatively, the vehicle speed sensor 8, by itself, or some other sensor(s) can be used to constitute the vehicle stopped status determination unit and the driving status determination unit.

Specifically, the neutral control device will perform neutral control provided that the shift position signal from the shift sensor 10 indicates a forward drive position, that the accelerator position signal of the accelerator position sensor 6 is zero, that the brake switch signal from the brake switch 7 is ON (indicating the brake pedal is depressed), that the vehicle speed signal from the vehicle speed sensor 8 is a prescribed value ($\approx 0$), and that the acceleration signal from the G sensor 9 indicates an acceleration that corresponds to a sloping road of prescribed angle or less. At the point in time that any of the above-described conditions for execution of neutral control is no longer met, such as the brake switch going OFF, the neutral control device will cancel neutral control.

With the acceleration detection device of the illustrated embodiment, drift of detected acceleration from the zero point is computed on the basis of a deviation between an estimated value of acceleration during a stop on a sloping road estimated from the change in acceleration occurring during rollback of the vehicle, and a detected value of acceleration during a stop on a sloping road based on the acceleration sensor signal, and then zero point correction of detected acceleration values is performed on the basis of this drift. Specifically, it is possible to accurately compute a change in acceleration from an acceleration sensor signal without any effect from drift error even in instances where there is a drift error that accompanies temporal changes or temperature changes in the acceleration sensor. In view of this, an attempt is made to compute drift more accurately by using highly reliable estimated acceleration during a stop on a sloping road calculated on the basis of a change in acceleration. As a result, more accurate zero point correction can be achieved.

Figure 2:
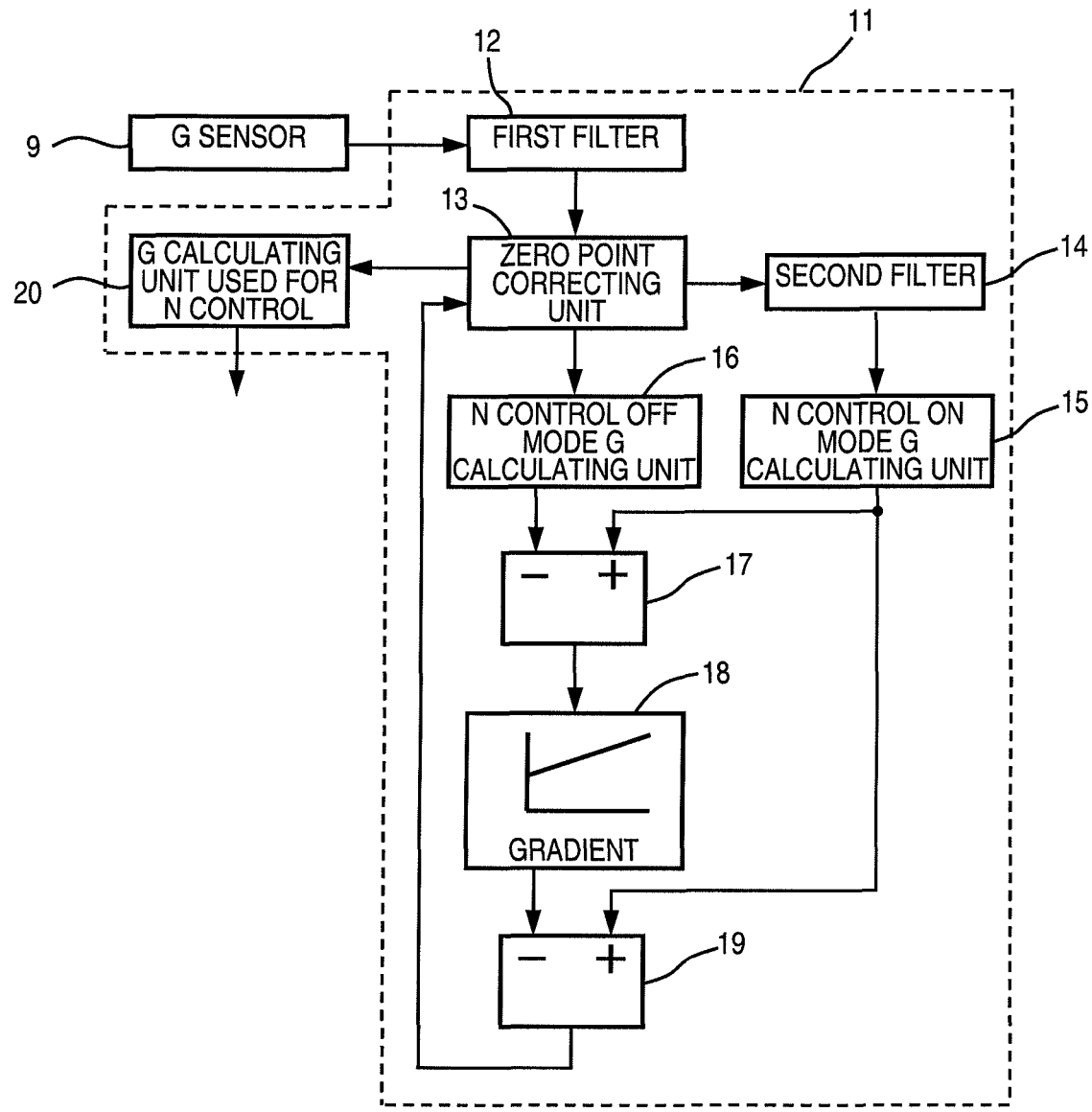
FIG. 2 is a control block diagram depicting a configuration of the acceleration detection device housed in the engine controller (ECU) in accordance with the illustrated embodiment of FIG. 1.

FIG. 2 is a control block diagram depicting the configuration of the acceleration detection device housed in the engine controller 4 of the illustrated embodiment. The acceleration detection device 11 of the illustrated embodiment utilizes rollback of the vehicle when the vehicle is released from the neutral control on a sloping road, and corrects deviation from a zero point (zero point correction) that has occurred in association with changes in temperature or temporal change of the G sensor 9.

The acceleration detection device 11 of the illustrated embodiment includes a first filter 12, a zero point correcting unit 13, a second filter 14, an N control ON mode G calculating unit 15, an N control OFF mode G calculating unit 16, a ΔG calculating unit 17, an acceleration estimating unit 18, a drift calculating unit 19, and a G calculating unit 20. The N control ON mode G calculating unit 15 constitutes a stopped acceleration detector that detects a detected stationary acceleration value when the vehicle is stopped on a sloping road based on an acceleration sensor signal from the G sensor 9 mounted on the vehicle. The N control ON mode G calculating unit 15 (stopped acceleration detector) detects the detected stationary acceleration value of the vehicle when the vehicle stopped determination unit (e.g., the accelerator position sensor 6, the brake switch 7, the vehicle speed sensor 8 and the shift sensor 10) determines the vehicle is stopped. The ΔG calculating unit 17 constitutes an acceleration change detector that detects an acceleration change associated with the vehicle transitioning from a stationary state to driving state on a sloping road based on the acceleration sensor signal from the G sensor 9. The ΔG calculating unit 17 (acceleration change detector) detects the acceleration change of the vehicle traveled during an interval from a time that the vehicle stopped determination unit (e.g., the accelerator position sensor 6, the brake switch 7, the vehicle speed sensor 8 and the shift sensor 10) determines that the vehicle is stopped until the driving status determination unit determines that the vehicle is currently being driven. The acceleration estimating unit 18 estimates an estimated stationary acceleration value based on the acceleration change that was detected by the ΔG calculating unit 17 (i.e., the acceleration change detector). The zero point correcting unit 13 constitutes a correcting unit that corrects the detected stationary acceleration value based on a deviation between the estimated stationary acceleration value and the detected stationary acceleration value. The drift calculating unit 19 constitutes a displacement calculating unit that calculates a displacement amount of the detected stationary acceleration value from a zero point based on the deviation between the estimated stationary acceleration value and the detected stationary acceleration value. The zero point correcting unit 13 performs a zero point correction for the detected stationary acceleration value based on the displacement amount.

The first filter 12 eliminates noise components (e.g., those on the order of 6 Hz) contained in the G sensor signal (acceleration signal).

On the basis of the amount of drift calculated by the drift calculating unit 19, the zero point correcting unit 13 will correct drift from zero in the G sensor signal that has passed through the first filter 12, and will output the corrected G sensor signal to the second filter 14, to the N control OFF mode G calculating unit 16, and to the G calculating unit 20 (zero point correction). The correction method used here is discretionary, and it is also possible to use a method using the nearest preceding single or several drift amounts, or a method using the average value of all previously calculated drift amounts.

In the illustrated embodiment, the zero point correction will be carried out only in instances where it has been detected that the roadway gradient, based on the G sensor signal, is excessively small in relation to the actual roadway gradient.

The second filter 14 eliminates vehicle spring vibration (e.g., about 1 to 2 Hz) contained in the zero point-corrected G sensor signal.

On the basis of the G sensor signal at the outset of the neutral control, i.e., subsequent to the zero point correction at the time when the vehicle is stopped on a sloping road, the N control ON mode G calculating unit 15 will calculate the detected acceleration during a stop on a sloping road.

On the basis of the zero point-corrected G sensor signal, the N control OFF mode G calculating unit 16 will calculate the detected acceleration (detected acceleration during rollback) at maximum opening as well as the detected acceleration during a stop on a sloping road detected when the vehicle rolls back immediately following completion of the neutral control.

Figure 3:
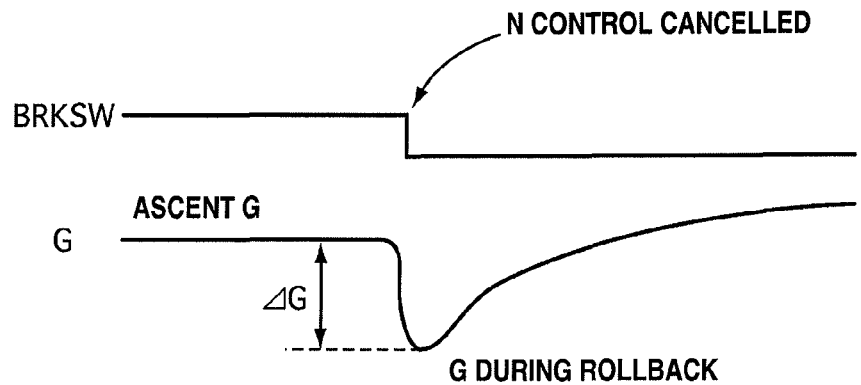
FIG. 3 is an illustration depicting a method of calculating acceleration change $\Delta G$ in accordance with the illustrated embodiment of FIGS. 1 and 2.

As shown in FIG. 3, based on the difference between detected acceleration during a stop on a sloping road and detected acceleration during rollback, the ΔG calculating unit 17 will calculate an acceleration change ΔG occurring that is associated with rollback of the vehicle during transition of the vehicle from being stationary on a sloping road to being driven, i.e., immediately following completion of the neutral control.

Figure 4:
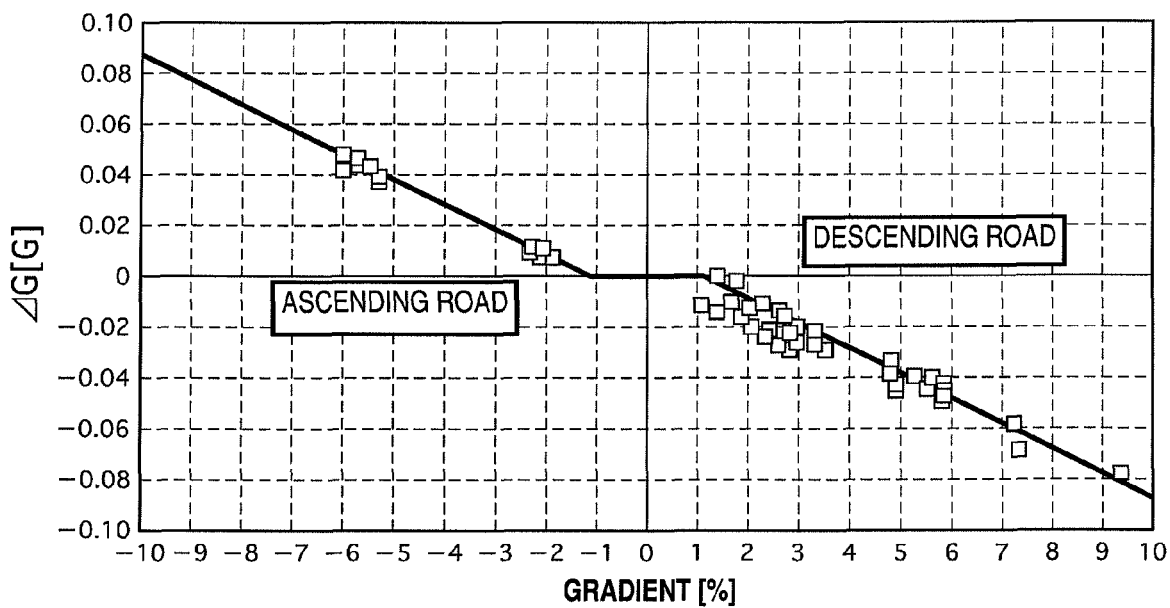
FIG. 4 is an illustration depicting an exemplary estimated roadway gradient calculating map in accordance with illustrated embodiment of FIGS. 1 and 2.

On the basis of the acceleration change ΔG, the acceleration estimating unit 18 will calculate sloping-road stop estimated acceleration during a stop on a sloping road. The acceleration estimating unit 18 is further provided with a roadway gradient calculating map in which estimated values of acceleration during a stop on a sloping road at various levels of acceleration change ΔG associated with rollback of the vehicle are preset for various vehicle characteristics. FIG. 4 depicts an exemplary estimated roadway gradient calculating map. Estimated acceleration during a stop on a sloping road, i.e., a roadway gradient (%), can be derived in advance experimentally from vehicle characteristics and acceleration change ΔG immediately following canceling of neutral control.

The drift calculating unit 19 is a comparator that outputs a differential value of two input values and calculates the amount of drift (error) of a detected acceleration from the zero point. The calculation is made on the basis of the difference between detected acceleration during a stop on a sloping road and an estimated acceleration during a stop on a sloping road.

The G calculating unit 20 calculates detected acceleration values from the G sensor signal subsequent to zero point correction. The output of this G calculating unit 20 is used in the neutral control.

Next, the zero point correction operation based on acceleration change during rollback will be discussed.

In the acceleration detection device 11 of FIG. 1, the amount of drift of the detected acceleration values from the zero point is calculated on the basis of deviation between the estimated acceleration during a stop on a sloping road that is estimated from the acceleration change ΔG during rollback of the vehicle, and the detected acceleration during a stop on a sloping road that is based on the G sensor signal. The zero point correction of detected acceleration is then performed on the basis of this amount of drift.

Specifically, in the event that drift error is produced in association with temporal changes or temperature changes in the G sensor 9, the detected acceleration values that are calculated on the basis of the G sensor signal will experience deviation by a certain amount of drift from the true values. However, irrespective of drift error of the G sensor, it will be possible to accurately calculate acceleration change ΔG from the G sensor signal during rollback of the vehicle and the G sensor signal during a stop on a sloping road.

Therefore, by accurately calculating the acceleration change ΔG during rollback, a highly reliable estimated acceleration during a stop on a sloping road can be derived from the vehicle characteristics. Then, by comparing the estimated acceleration during a stop on a sloping road with the detected acceleration that occurs during a stop on a sloping road and is based on the G sensor signal, it will be possible to accurately calculate the amount of drift and to achieve optimal zero point correction.

Figure 5:
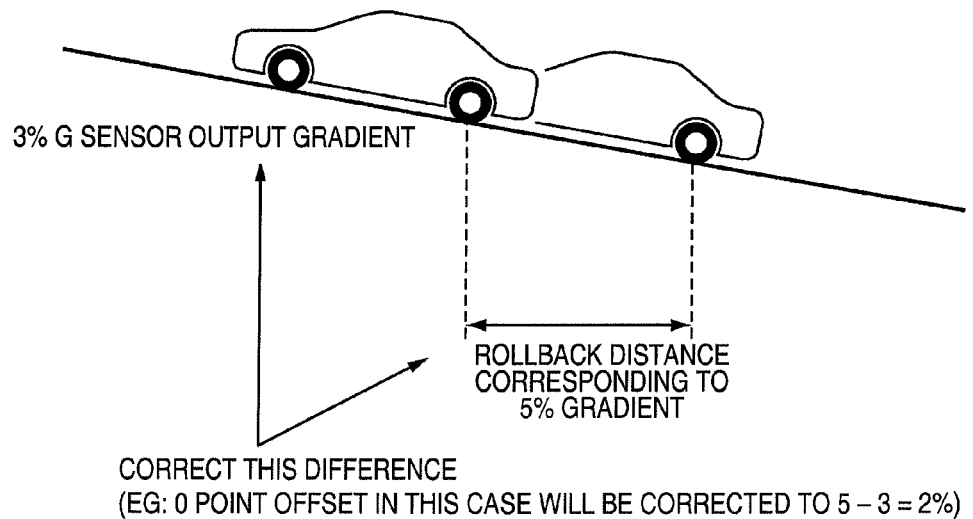
FIG. 5 is an illustration depicting the method of zero point correction in accordance with the illustrated embodiment of FIGS. 1 and 2.

An example of zero point correction is depicted in FIG. 5. For example, let it be assumed that a detected acceleration equivalent to a 3% gradient on an uphill slope is detected, and that when the vehicle subsequently rolls back down the uphill slope upon release of the brake, an estimated acceleration equivalent to a 5% gradient (rollback distance corresponding to a 5% gradient) is calculated on the basis of the acceleration change ΔG. In this instance, the difference (2%) between the estimated gradient (5%) and the detected gradient (3%) will be calculated as the amount of drift, and the G sensor signal will be offset in the zero point correcting unit 13 in the positive direction by the equivalent of a 2% gradient (in the case of correction by the nearest preceding amount of drift only).

In the illustrated embodiment, the acceleration estimating unit 18 is further provided with a map for estimating and calculating acceleration during a stop on a sloping road in which estimated values of acceleration during a stop on a sloping road at various levels of acceleration change ΔG associated with rollback of the vehicle are preset for various vehicle characteristics. The vehicle will roll backwards when the driver releases the brake during a stop on a sloping road, and the sloping road exceeds a certain gradient. In this case, the acceleration change ΔG of the vehicle generated in accordance with the magnitude of the gradient can be derived in advance through experimentation or simulation. Therefore, by mapping an estimated acceleration during a stop on a sloping road for various levels of acceleration change ΔG, the calculation processing overhead can be reduced and estimated value calculations can be accelerated.

In the illustrated embodiment, the first filter 12, which eliminates the noise components included in the G sensor signal, is disposed in a pre-stage of the G calculating units 15, 16 and 20. Since the on-board sensors of a vehicle normally contain intermingled noise components, positioning the first filter 12 in a pre-stage of the G calculating units 15, 16 and 20 for eliminating the noise components makes it possible to obtain a G sensor signal that is free from the effects of noise.

In the illustrated embodiment, the second filter 14, which eliminates vehicle spring vibration components included in the G sensor signal, is disposed in a pre-stage of the N control OFF mode G calculating unit 15. Typically, a vehicle will experience appreciable vibration immediately before and after the vehicle comes to a stop, and thus the G sensor signal will contain numerous spring vibration components associated with vibration of the vehicle. Therefore, eliminating the spring vibration components included in the G sensor signal in a pre-stage of the N control OFF mode G calculating unit 15 makes it possible to obtain a G sensor signal that is free from the effects of vehicle vibration.

In a vehicle equipped with an automatic transmission, the creep force that is transmitted to the wheels from the automatic transmission via a torque converter and that originates from the driving force of the engine at idling speed is not needed when the vehicle is to be kept stationary. Since this creep force must be suppressed by the brakes, the fuel efficiency of the engine will be lower to a corresponding extent.

For this reason, it has been proposed to improve the fuel efficiency by carrying out neutral control whereby, if the brake pedal is depressed to apply the brakes while the vehicle is at a stop with the accelerator completely closed and the gear in the forward drive position, the automatic transmission will be placed in neutral while the gear will still in the forward drive position. Herein, neutral refers to a condition approximating neutral, i.e., it includes instances where the automatic transmission clutch is in a half-clutch state.

With the neutral control described above, some time will be required before the clutch engages immediately after control is canceled and the wheels generate driving force; thus, rollback of the vehicle on sloping roads can be a problem. In order to prevent such rollback, there has been proposed a method wherein a condition for initiating neutral control is that the roadway gradient be determined using the G sensor, and neutral control is carried out solely within a gradient range associated with acceptable rollback.

On the other hand, where output values (zero point) have deviated due to a temperature drift of the G sensor or the like, the gradient can no longer be determined accurately, causing neutral control to be initiated and creating the problem of unexpected rollback when such control is canceled despite the existence of a gradient for which the rollback of the vehicle is unacceptable.

In contrast, with the neutral control device of the illustrated embodiment, using the acceleration detection device 11 shown in FIG. 2 as a roadway gradient detecting device allows the neutral control device (the engine controller 4, the automatic transmission controller 5) to release the engaging element 2*a* (clutch) in the event that the detected acceleration detected by the acceleration detection device 11 is less than the equivalent of a prescribed gradient.

Thus, even in the event that a drift error that accompanies degradation or a temperature change in the G sensor 9 is generated, the true gradient of the roadway can be detected through zero point correction by the acceleration detection device 11, and unexpected rollback of the vehicle can be reliably avoided.

Figure 6:
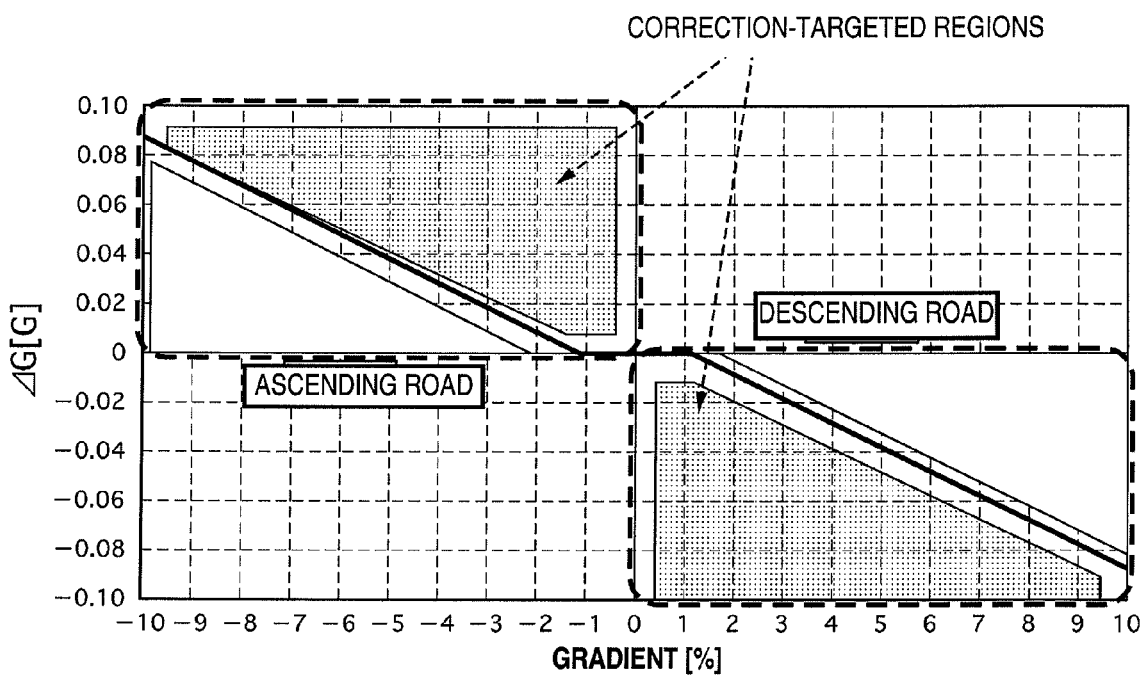
FIG. 6 is an illustration depicting a map for estimating and calculating acceleration during a stop on a sloping road, with areas for performing the zero point correction being shaded.

In the neutral control device of the illustrated embodiment, the zero point correcting unit 13 will perform zero point correction only in areas indicated as correction targeted regions in the roadway gradient map that corresponds to the acceleration change ΔG shown in FIG. 6. Specifically, in the event that the absolute value of estimated acceleration during a stop on a sloping road is greater than the absolute value of detected acceleration during a stop on a sloping road, then the zero point correcting unit 13 will be performed.

That is, in the event that the detected value of the roadway gradient is less than the estimated value, there is a possibility that neutral control will be initiated on a gradient associated with unacceptable rollback. On the other hand, if the detected value is greater than the estimated value, then the neutral control will never be initiated on a gradient associated with unacceptable rollback. Accordingly, by performing zero point correction only in instances where the detected value of the roadway gradient is less than the estimated value, correction of the drift error with no effect on the neutral control can be dispensed with and superfluous zero point correction can be avoided.

Figure 7:
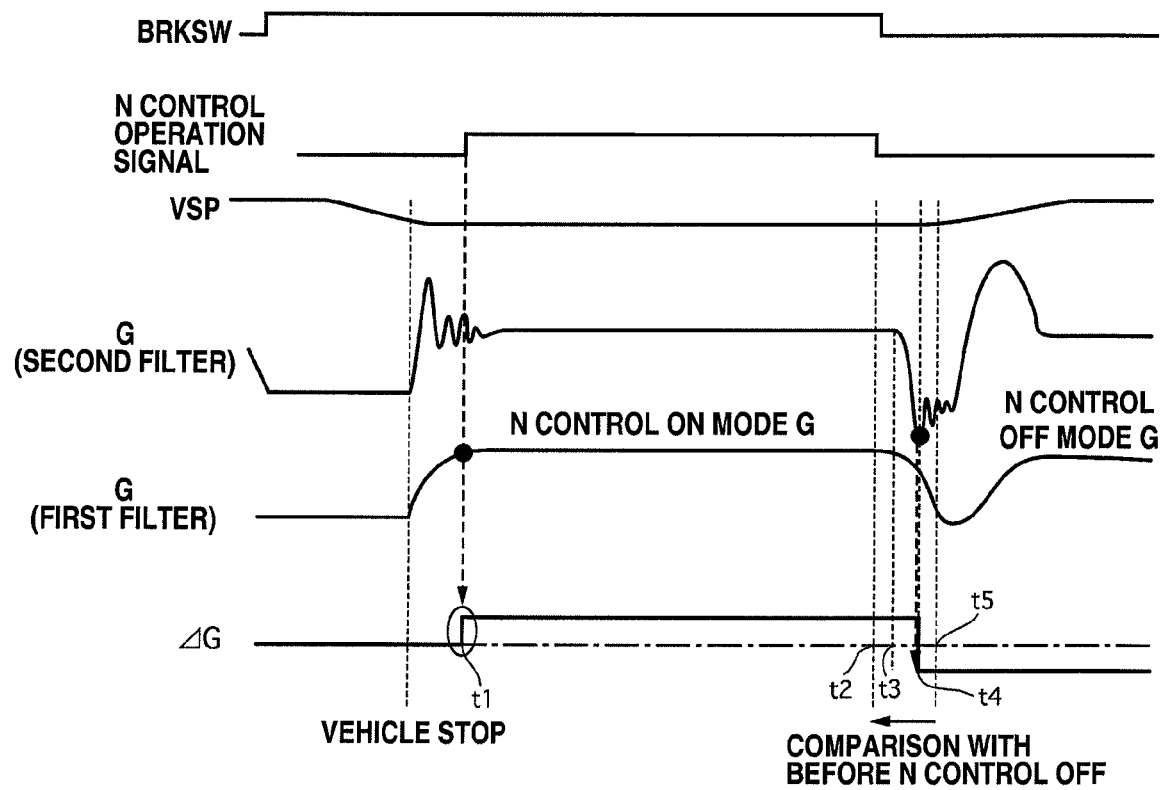
FIG. 7 is a timing chart depicting the zero point correction operation during a stop on a sloping road in accordance with the illustrated embodiment of FIG. 1.

FIG. 7 is a timing chart depicting the operation of zero point correction during a stop on a sloping road in accordance with the illustrated embodiment.

At time t1, the following initiation conditions hold true: the brake switch (BRKSW) is ON, the vehicle is at a stop (vehicle VSP of zero and accelerator position of zero), and the roadway gradient is less than a prescribed angle. Therefore, the neutral control is initiated and the automatic transmission 2 goes into neutral. Immediately thereafter, the detected acceleration during a stop on a sloping road is calculated in the N control ON mode G calculating unit 15.

Here, the vehicle will vibrate appreciably and the G sensor signal will be affected immediately after the vehicle has come to a stop, but the spring vibration components of the vehicle are eliminated by the second filter 14. Thus, the detected acceleration during a stop on a sloping road can be calculated on the basis of a G sensor signal from which the effects of vibration have been eliminated. Moreover, noise components included in the G sensor signal are eliminated by the first filter 12.

During the interval from time t1 to t2, the vehicle is at a stop, and a constant G sensor signal dependent on the roadway gradient will therefore be output.

At time t2, the driver releases his or her foot from the brake pedal and the brake switch goes OFF, whereby the neutral control is canceled and the clutch of the automatic transmission 2 begins to transition from the released state (or half-clutch state) to the engaged state. At this time, calculation of detected acceleration on the basis of the G sensor signal and comparison of the calculated detected acceleration with the detected acceleration during a stop on a sloping road begin in the N control OFF mode G calculating unit 16.

At time t3, the vehicle begins to roll back down the hill. At time t4, the difference between the current detected acceleration and the previous detected acceleration during a stop on a sloping road reaches its maximum value. The acceleration change ΔG will therefore be calculated from the difference between these two detected accelerations in the ΔG calculating unit 17. An estimated acceleration during a stop on a sloping road can thereby be calculated in the acceleration estimating unit 18 on the basis of the acceleration change ΔG. Also the amount of drift of the zero point correction is calculated in the drift calculating unit 19 from the difference between the estimated acceleration during a stop on a sloping road and the detected acceleration during a stop on a sloping road.

At time t5, the clutch of the automatic transmission 2 is engaged, and exit from the neutral control is complete.

Next, the effects will be discussed.

The acceleration detection device of the illustrated embodiment affords effects such as the following, by way of example.

(1) The acceleration detection device 11 is provided with the N control ON mode G calculating unit 15 for calculating the detected acceleration during a stop on a sloping road on the basis of the G sensor signal when the vehicle is stopped on a sloping road. The ΔG calculating unit 17 is provided for detecting the acceleration change ΔG that accompanies rollback of the vehicle during transition of the vehicle from being stationary on a sloping road to being driven. The acceleration estimating unit 18 is provided for calculating, based on the acceleration change ΔG, the estimated acceleration when the vehicle is stopped on the sloping road. The drift calculating unit 19 is provided for calculating the amount of drift of detected acceleration from the zero point on the basis of the difference between the estimated acceleration during a stop on a sloping road and the detected acceleration during a stop on a sloping road. The zero point correcting unit 13 is provided for performing zero point correction of the detected acceleration on the basis of the amount of drift. By so doing, it is possible to achieve greater accuracy of zero point correction.

(2) The provision of the first filter 12, which eliminates noise components included in the G sensor signal, results in a G sensor signal that is free from the effects of noise.

(3) Since the second filter 14, which eliminates vehicle spring vibration components included in the G sensor signal, is disposed in a pre-stage of the N control ON mode G calculating unit 15, it is possible to obtain a G sensor signal that is free from the effects of vibration of the vehicle immediately after the vehicle comes to a stop.

(4) The acceleration estimating unit 18 is provided with a map for estimating and calculating acceleration during a stop on a sloping road in which estimated values of acceleration that occurs during a stop on a sloping road and corresponds to various levels of acceleration change $\Delta G$ that accompany rollback of the vehicle are preset for various vehicle characteristics. Thus, the calculation processing overhead can be reduced, and estimated value calculations can be accelerated.

(5) The detected acceleration during a stop on a sloping road is obtained on the basis of a G sensor signal for a vehicle stopped on a sloping road, an acceleration change $\Delta G$ that accompanies rollback of the vehicle during transition of the vehicle from being stationary on a sloping road to being driven is calculated on the basis of the G sensor signal, an estimated acceleration during a stop on a sloping road is calculated on the basis of the acceleration change $\Delta G$, the amount of drift of detected acceleration from the zero point is calculated on the basis of the difference between the estimated acceleration during a stop on a sloping road and the detected acceleration during a stop on a sloping road, and zero point correction of detected acceleration is performed on the basis of the amount of drift. By so doing, it is possible to achieve greater accuracy of zero point correction.

(6) The neutral control device (engine controller 4, automatic transmission controller 5) is provided for releasing the engaging element 2a of the automatic transmission 2 that engages when the vehicle starts to move. A case may be considered in which the gear is in the forward drive position, the accelerator is not being depressed, the vehicle is stopped through depression of the brake, and the gradient of the roadway, as detected by the roadway gradient detecting means, does not exceed a prescribed angle, where the aforementioned acceleration detection device 11 is used as the roadway gradient detecting device. In this case, the neutral control device will release the engaging element 2a of the automatic transmission 2 if the detected acceleration detected by the acceleration detection device 11 does not exceed the equivalent of the prescribed angle mentioned earlier. By so doing, unexpected rollback of the vehicle can be avoided.

(7) The zero point correcting unit 13 performs zero point correction of detected acceleration only in the event that the absolute value of estimated acceleration during a stop on a sloping road is greater than the absolute value of detected acceleration during a stop on a sloping road, whereby correction of drift error with no effect on neutral control can be dispensed with, and superfluous zero point correction can be avoided.

While the illustrated embodiment is an example of use of the acceleration detection device as a roadway gradient detecting device in a neutral control device, the acceleration detection device could be appropriately employed in other vehicle control devices as a device for zero point correction of vehicle on-board acceleration sensors.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function. The term "configured" as used herein to describe a component, section or part of a device includes hardware and/or software that is constructed and/or programmed to carry out the desired function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. An acceleration detection device for detecting acceleration of a vehicle, comprising:
   a stopped acceleration detector that detects a detected stationary acceleration value when the vehicle is stopped on a sloping road based on an acceleration sensor signal from an acceleration sensor mounted on the vehicle;
   an acceleration change detector that detects an acceleration change associated with the vehicle transitioning from a stationary state to a driving state on the sloping road based on the acceleration sensor signal, the acceleration change detector detecting the acceleration change as a maximum difference between the detected stationary acceleration value and an acceleration value that is detected while the vehicle is rolling back on the sloping road;

an acceleration estimating unit that includes an estimated acceleration calculating map in which estimated values of acceleration that correspond to the acceleration change are preset in accordance with vehicle characteristics, the acceleration estimating unit calculating an estimated stationary acceleration value based on the acceleration change that was detected by the acceleration change detector according to the estimated acceleration calculating map; and a correcting unit that corrects the detected stationary acceleration value based on a deviation between the estimated stationary acceleration value and the detected stationary acceleration value.

2. The acceleration detection device according to claim 1, further comprising a vehicle stopped status determination unit configured to determine whether the vehicle is currently stopped, and the stopped acceleration detector detects the detected stationary acceleration value of the vehicle when the vehicle stopped determination unit determines the vehicle is stopped.

3. The acceleration detection device according to claim 2, further comprising a driving status determination unit that determines whether the vehicle is currently being driven, and the acceleration change detector detects the acceleration change of the vehicle traveled during an interval from a time that the vehicle stopped status determination unit determines that the vehicle is stopped until the driving status determination unit determines that the vehicle is currently being driven.

4. The acceleration detection device according to claim 1, further comprising a displacement calculating unit that calculates a displacement amount of the detected stationary acceleration value from a zero point based on the deviation between the estimated stationary acceleration value and the detected stationary acceleration value, and the correcting unit performs a zero point correction for the detected stationary acceleration value based on the displacement amount.

5. The acceleration detection device according to claim 1, further comprising a first filter configured to eliminate noise components included in the acceleration sensor signal.

6. The acceleration detection device according to claim 1, further comprising a second filter configured to eliminate vehicle spring vibration components included in the acceleration sensor signal.

7. A neutral control device provided with the acceleration detection device according to claim 1, wherein the neutral control device is configured to release an engaging element of an automatic transmission, which engages to start the vehicle moving from a neutral state, when the automatic transmission is in a forward drive position, an accelerator pedal is released, a brake pedal is depressed, and a roadway gradient of the sloping road is below a prescribed angle as determined by the detected stationary acceleration value detected by the acceleration detection device not exceeding an equivalent value to the prescribed angle.

8. The neutral control device according to claim 7, wherein the correcting unit performs a zero point correction for the detected stationary acceleration value only when an absolute value of the estimated stationary acceleration value when stopped on the sloping road is greater than an absolute value of the detected stationary acceleration value when stopped on the sloping road.

9. The acceleration detection device according to claim 1, wherein the estimated stationary acceleration value calculated by the acceleration estimating unit varies depending on the acceleration change detected by the acceleration change detector.

10. The acceleration detection device according to claim 1, wherein the estimated acceleration calculating map includes the estimated values of acceleration corresponding to different levels of the acceleration change that are associated with different roadway gradients.

11. The acceleration detection device according to claim 10, wherein the acceleration estimating unit calculates the estimated stationary acceleration value as one of the estimated values of acceleration that corresponds to the acceleration change detected by the acceleration change detector in the estimated acceleration calculating map.

12. The acceleration detection device according to claim 1, wherein the correcting unit performs a zero point correction for the detected stationary acceleration value only when an absolute value of the estimated stationary acceleration value when stopped on the sloping road is greater than an absolute value of the detected stationary acceleration value when stopped on the sloping road.

13. An acceleration detection device for detecting acceleration of a vehicle, comprising:

stopped acceleration detecting means for detecting a detected stationary acceleration when the vehicle is stopped on a sloping road;

acceleration change detecting means for detecting an acceleration change associated with the vehicle transitioning from a stationary state to a driving state on the sloping road, the acceleration change detecting means detecting the acceleration change as a maximum difference between the detected stationary acceleration value and an acceleration value that is detected while the vehicle is rolling back on the sloping road;

acceleration estimating means for calculating an estimated stationary acceleration based on the acceleration change that was detected by the acceleration change detecting means according to an estimated acceleration calculating map in which estimated values of acceleration that correspond to the acceleration change are preset in accordance with vehicle characteristics; and correcting means for correcting the detected stationary acceleration based on a deviation between the estimated stationary acceleration and the detected stationary acceleration.

14. The acceleration detection device according to claim 13, wherein the estimated stationary acceleration calculated by the acceleration estimating means varies depending on the acceleration change detected by the acceleration change detecting means.

15. An acceleration detection method comprising:
receiving a first acceleration sensor signal from an acceleration sensor mounted on a vehicle when the vehicle is stopped on a sloping road;
receiving a second acceleration sensor signal from the acceleration sensor while the vehicle is rolling back on the sloping road;
calculating an acceleration change associated with the vehicle transitioning from a stationary state to a driving state on the sloping road, the acceleration change being calculated as a maximum difference between a detected stationary acceleration value of the first acceleration sensor signal and an acceleration value of the second acceleration sensor signal that is detected while the vehicle is rolling back on the sloping road;
calculating an estimated stationary acceleration value based on the acceleration change between the first and second acceleration sensor signals according to an estimated acceleration calculating map in which estimated values of acceleration that correspond to the acceleration change are preset in accordance with vehicle characteristics; and
correcting a detected stationary acceleration value of the first acceleration sensor signal based on a deviation between the estimated stationary acceleration value and the detected stationary acceleration value.

16. The acceleration detection method according to claim 15, wherein
the estimated stationary acceleration value varies depending on the acceleration change between the first and second acceleration sensor signals.

* * * * *